US006866256B2

(12) United States Patent
Wahl

(10) Patent No.: US 6,866,256 B2
(45) Date of Patent: Mar. 15, 2005

(54) SUPPORT/CHOCKING DEVICE

(76) Inventor: Michel Wahl, Impasse du Chemin de Fer, 67660 Betschdorf (FR)

( * ) Notice: Subject to any disclaimer, the term of this patent is extended or adjusted under 35 U.S.C. 154(b) by 0 days.

(21) Appl. No.: 10/210,164

(22) Filed: Jul. 31, 2002

(65) Prior Publication Data

US 2003/0141648 A1 Jul. 31, 2003

(30) Foreign Application Priority Data

Jan. 30, 2002 (EP) ........................................... 02360049

(51) Int. Cl.[7] ................................................ B23Q 3/00

(52) U.S. Cl. ...................................................... 269/246

(58) Field of Search ................................ 269/296, 905; 211/42; 414/11; 182/153, 152; 248/459

(56) References Cited

U.S. PATENT DOCUMENTS 2,874,003 A * 2/1959 Humphries ................. 182/153
3,007,278 A * 11/1961 Million ...................... 248/448

FOREIGN PATENT DOCUMENTS

FR 2709805 9/1993

* cited by examiner

*Primary Examiner*—Robert C. Watson
(74) *Attorney, Agent, or Firm*—Abelman, Frayne & Schwab

(57) ABSTRACT

Device for enabling a rigid or semi-rigid material of a planar shape or of the thin, elongate type to be rapidly supported and chocked in order to carry out a finishing process on it. The device includes a top chocking structure on which the material to be finished can be supported and clamped, the top structure being made from one or more elements of the bar or tube type extending essentially in a vertical plane and having at least one substantially horizontal support portion, extended by a substantially vertical support portion. The device includes a bottom base structure on which on which the top structure is mounted, enabling the device to be stabilized on a working surface, the support zones of which are fitted with non-slip fixtures.

9 Claims, 11 Drawing Sheets

SUPPORT/CHOCKING DEVICE

The present invention relates to a device enabling a rigid or semi-ridge material of a planar shape, such as a panel, a plate, a board, etc. for example, or of the thin, elongate type such as a batten, a bead, a tube, a rod, etc. for example, to be rapidly supported and chocked in order to carry out a finishing process on it. By finishing process is meant cutting, plating, filing, planing, welding, sanding, etc.

In the majority of trades, these operations are carried out last of all, when the bulk of the building or site work is virtually complete, or involve applying a finish. For this purpose, the material on which the operator or craftsman intends to work has to be properly steadied to enable the work to be carried out with the requisite due care and accuracy so as to integrate the material with the rest of the structure. For reasons of time, design or space, it is not always possible to use the usual clamping means on a conventional frame. This being the case, the operator is tempted or obliged to wedge the material to be finished in any way he can, for example against a chair or a wall frame, but the inherent lack of stability and accuracy with this type of wedging can lead to finishing errors of degradation of the material in the best of cases and in the worse situation can lead to accidents caused by slippage of the tools used to carry out the work.

The applicant has already proposed a set of wedging supports, described in the French patent specification filed under number 93/10696 (publication No. 2,709,806), specifically intended for the above-mentioned purpose.

However, this device, made up of different sized pieces, has proved to be somewhat impractical, due to its size and its weight in particular.

The objective of the invention is to overcome the drawbacks of the prior art by proposing a solution that is easy to use and which is relatively inexpensive to manufacture.

In order to achieve these objectives, the device proposed by the invention is characterized in that it comprises:

- firstly, a top chocking structure on which the material to be finished can be supported and clamped, said top structure being made from one or more elements of the bar or tube type essentially extending in a vertical plane and having at least one substantially horizontal support portion extended by a substantially vertical support portion; and
- secondly, a bottom base structure on which the top structure is mounted, enabling the device to be stabilized on a working surface and the support zones of which are fitted with non-slip fixtures. The devices proposed by the invention are often used in pairs, especially if the material to be finished has a large, planar surface.

The base structure is designed so that it has points or areas of support, spaced sufficiently far apart from one another to provide perfect stability, in spite of the fact that the support structure extends in a vertical plane. Furthermore, the chosen confirmation must ensure correct positioning, even if the ground is uneven. In situations where there are three points of support, for example, one of them might be a broader point of support than its other two supporting areas.

By virtue of one option, the bottom base structure is made from at least one longitudinal element of the bar or tube type, with a central, horizontally extending section, each of the ends of which bas two symmetrical side arms, of which the free ends constitute the points of support on the working surface.

More specifically, tow of the side arms located at one of the ends part from the central section out to the side in a symmetrical arrangement and are downwardly inclined, whilst the arms at the other end form a symmetrical V-shaped fork, extending in the extension of the central section of the bottom structure, the free end of each arm being downwardly bent or angled and extending vertically.

This rather simple structure makes for a relatively lightweight but nevertheless stable chocking support.

By preference, the bottom base structure of each chocking support may be made from at least two symmetrical tubes, secured to one another longitudinally.

Two bars, bent to a sufficient degree at their ends, for example, may be used for each part, said bars then being welded to one another.

In one possible embodiment, the bottom base structure of each support consists of a single base piece of a parallelepipedic design, the top structure being joined to its top face and its opposing face being fitted with non-slip feet forming the points of support on the working surface.

The top bar or tube type structure of each device proposed by the invention has chocking means designed to co-operate respectively with the substantially horizontal and vertical support sections.

The user in effect holds the material to be finished with one hand, essentially applying pressure from the top down, and is then able to manoeuvre has tool with the other hand.

By preferences said substantially horizontal support portion is inclined and its lower end is adjacent to a vertically extending chocking portion, the former being intended to provide support for one side of a board type material and the latter being designed to support and chock an edge thereof.

By virtue of an extra option, the vertically extending chocking portion may have a section bent in a sideways V-shaped arrangement, designed to accommodate the edge of a board type material, the face of which is supported against the inclined portion.

More specifically, the lower branch of said angled V section may be horizontally disposed by preference, whilst a support piece attached to said vertically extending chocking portion provides a horizontal extension of said branch, forming a support in conjunction with it for chocking a board type material in a horizontal position.

The vertically extending support portion adjacent to the lower end of the substantially horizontally inclined portion may also have a hook at its lower end, oriented so as to extend laterally beyond the vertical plane of the top structure of bars or tubing.

This design is more specifically suited to chocking a bar or tube, a part of which is fed through the hook whilst being additionally retained underneath one of the side arms of the bottom base structure.

In situations requiring vertical chocking, two supporting chocks are used on either side of the mid-plane of the material and at each end of it so that the chocking means of one chock co-operate symmetrically with those of the other chock.

The substantially vertical support portion is used in this case and is inclined, its bottom end being curved into a hook disposed in the vertical plane of the top structure so as to chock the edge of a board type material.

To enable the board to be chocked when the above-mentioned devices proposed by the invention are in a symmetrical position, each of the devices has a half washer designed to fit around the substantially vertically inclined support portion, it being possible to rotate said washer around the latter until it is brought into abutment against one face of the board type material.

Alternatively, the support piece may he designed to pivot about an axis perpendicular to the vertical plane of the top structure so that it can be moved into abutment against a face of the board type material.

In yet another variant, said piece may be slidingly mounted on the substantially horizontal support portion, so that it can be displaced and brought into abutment against a face of said board type material, and has clamping means on the portion on which it slides.

Finally, in a last variant, a clamping action may be obtained by providing the top end of the substantially vertical portion with a curved section forming a projection designed to abut with a face of the board type material.

The device proposed by the invention is used in the form of a kit, which may include extra elements, giving it a high degree of modularity. For example, this device may include a detachable board type support piece, the shape and edges of which are provided with a center groove enabling it to be mounted on the substantially horizontal support portion and adjacent vertically extending chocking portion, said piece having one or more V-shaped cuts on its top edge.

This element, which nests on each chocking support proposed by the invention will enable material having a particular shape of wall to he positioned, such as a gutter.

The invention may also be used in conjunction with one or more complementary supports co-operating with at least one chocking support to hold a planar material in a horizontal or slightly inclined position. It may be a support frame having at least three points of support on the ground and a top portion enabling the planar material to be clamped in position.

By preference, the top part will then consist or a vertically extending bar fitted with an non-slip end-piece piece and each point of support on the ground is also fitted with an non-slip end-piece.

The tripod design is known per se and affords a high degree of stability.

The invention will now be described in more detail with reference to the appended drawings of which:

Figure 6:
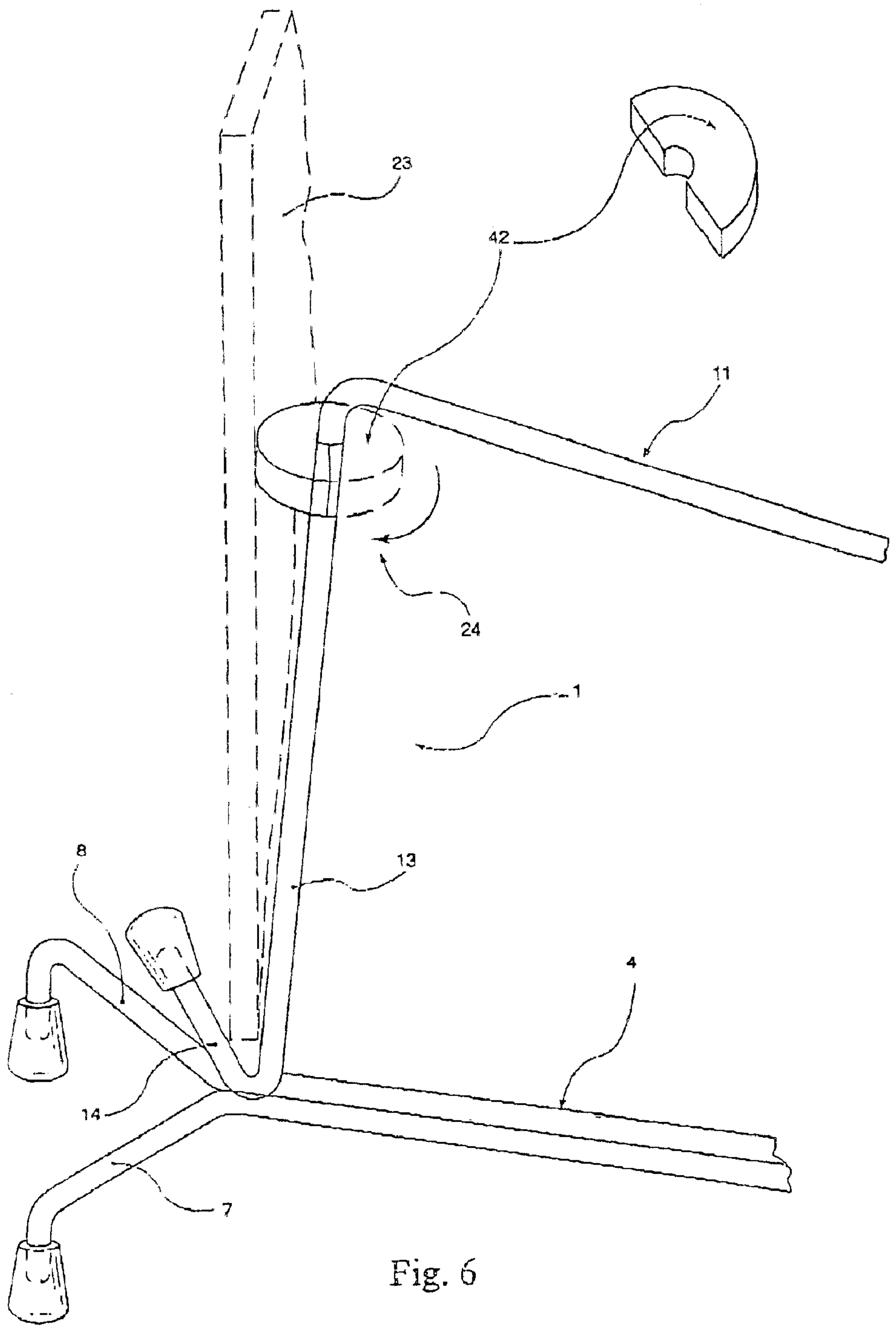
Figure 7:
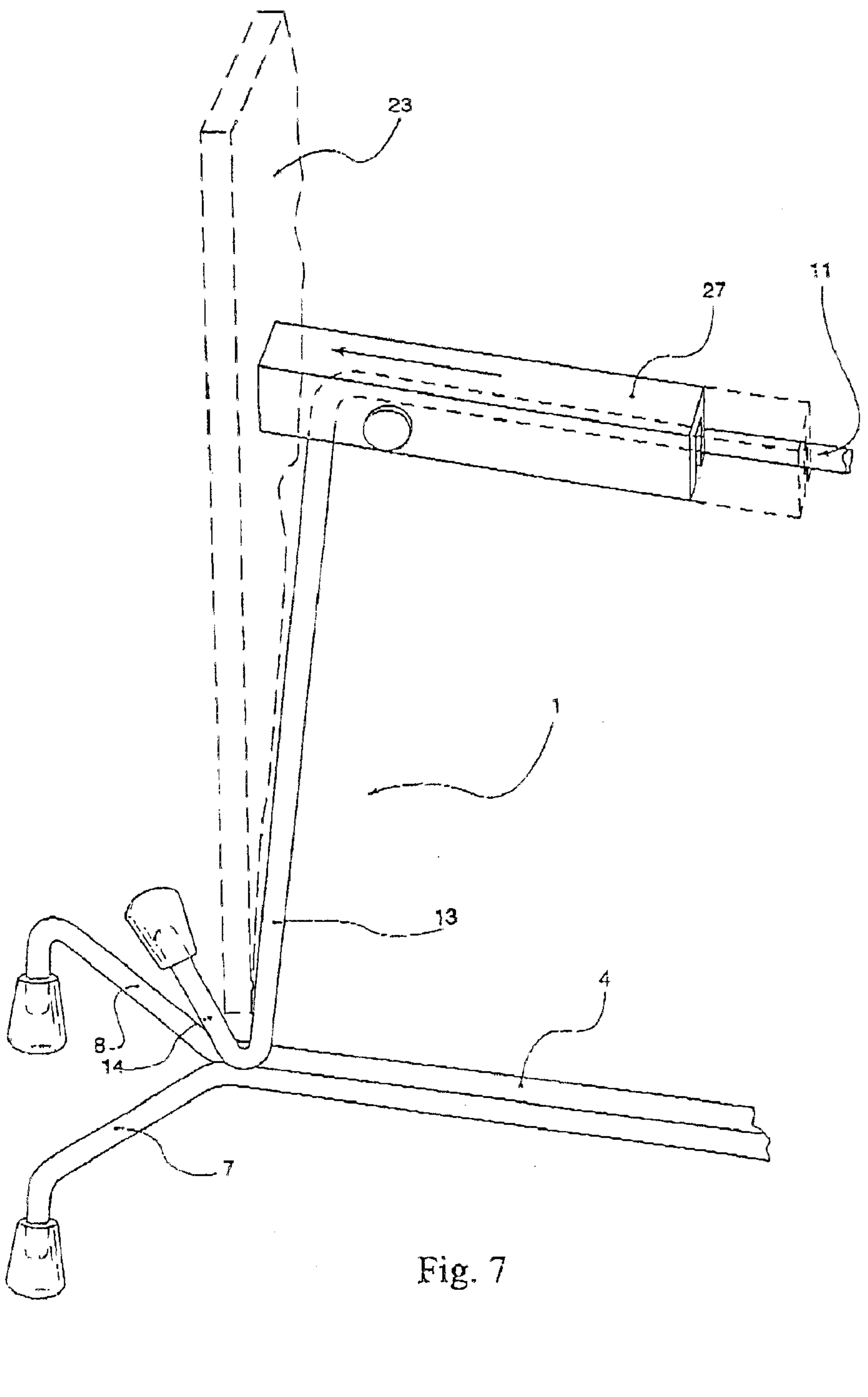
Figure 8:
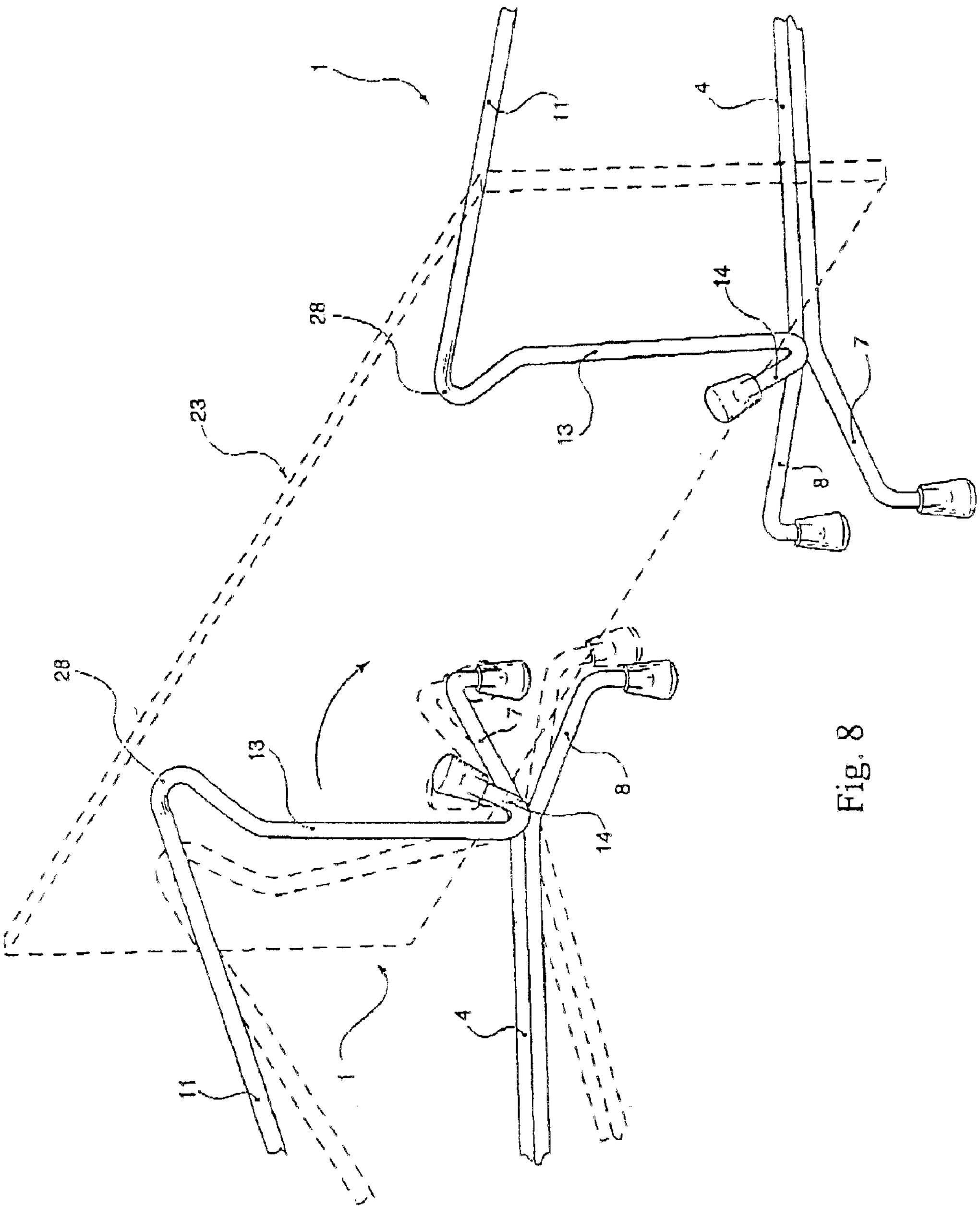
Figure 9:
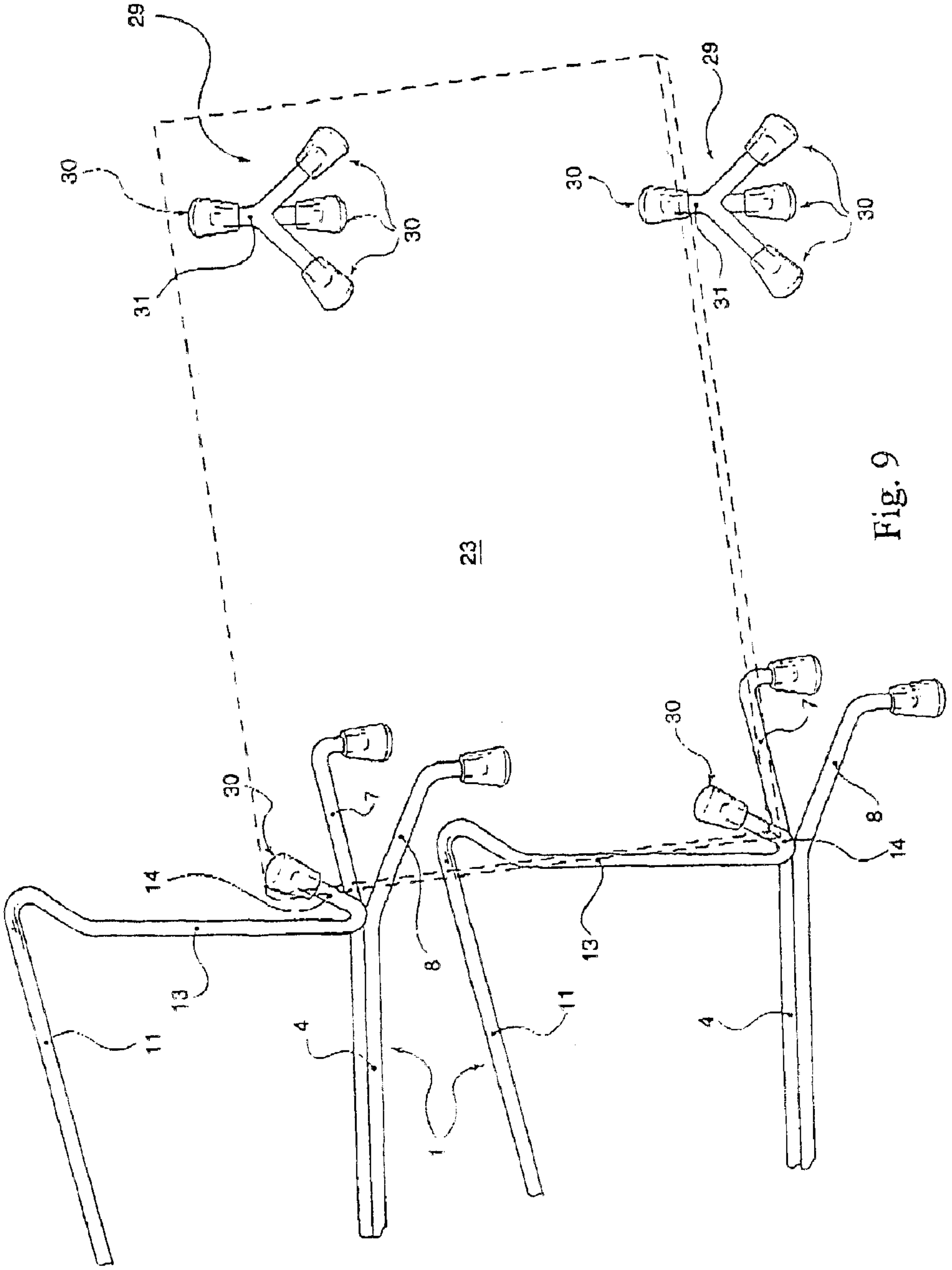
Figure 10:
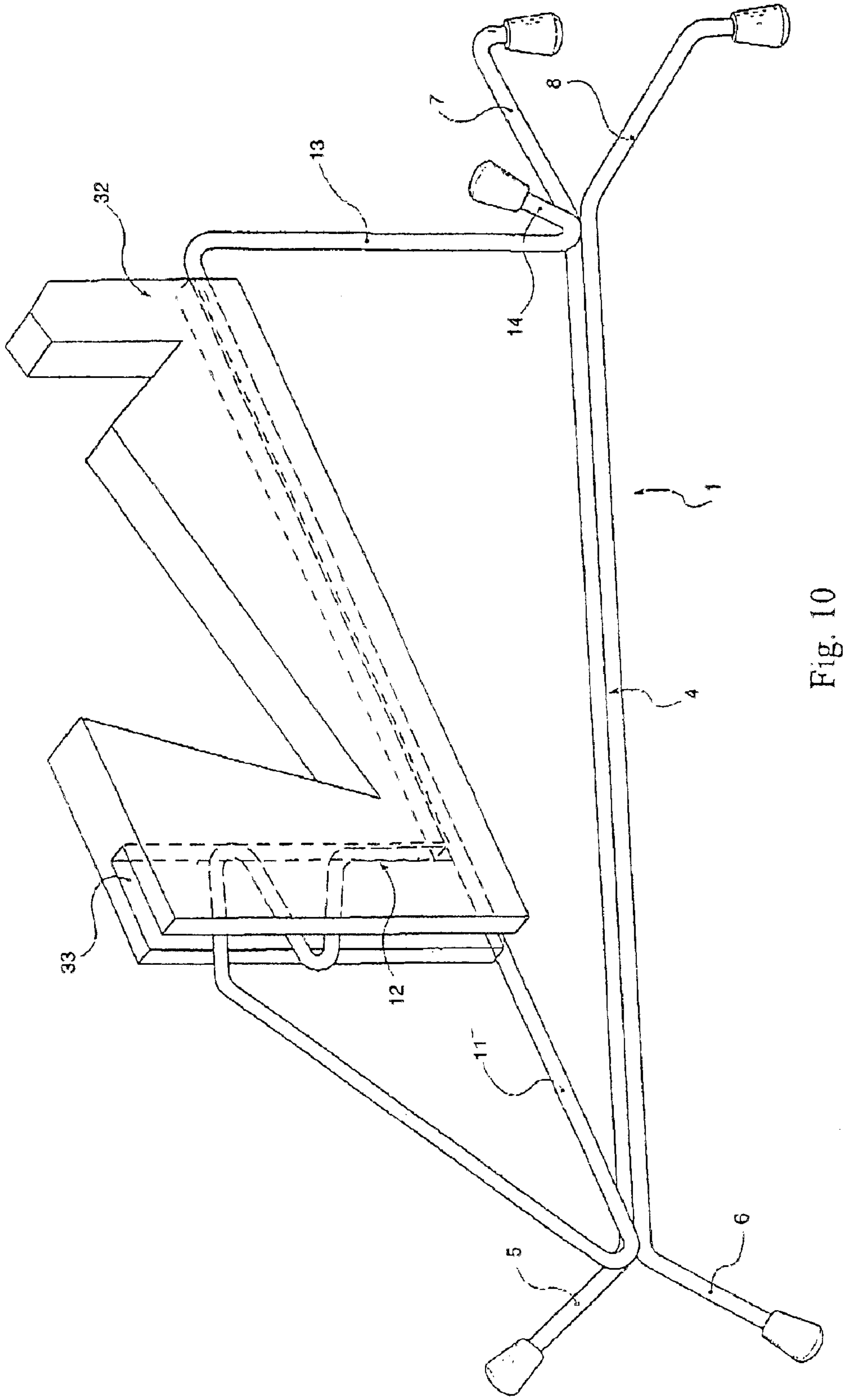
Figure 11:
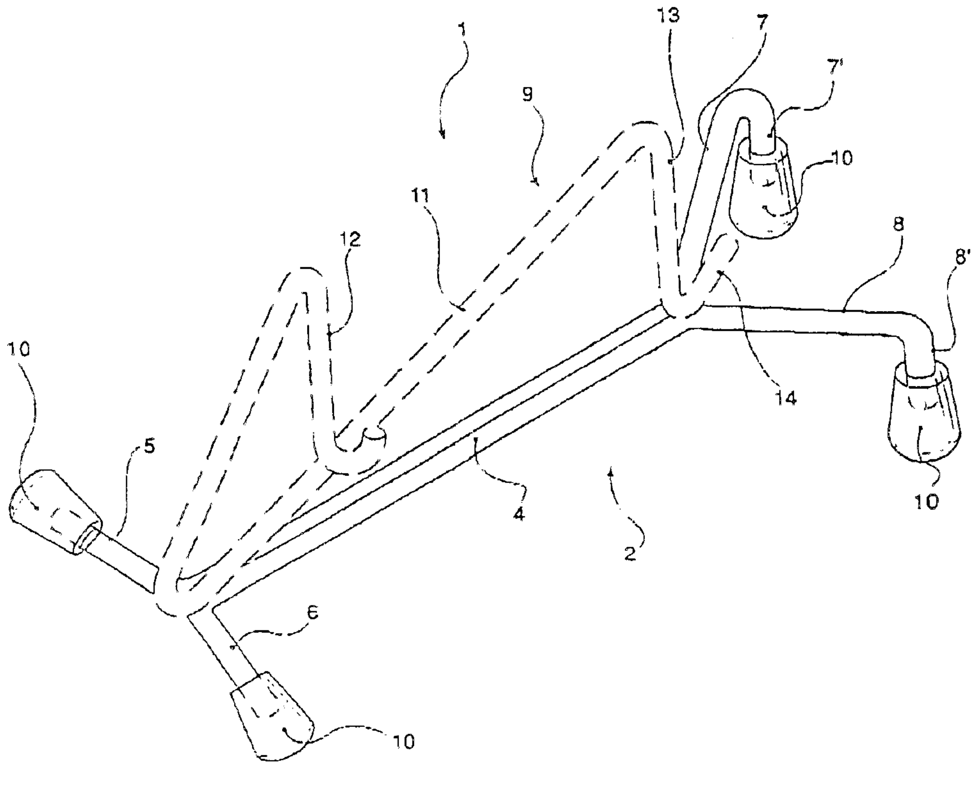

FIGS 6, 7 and 8, finally, show means for clamping panel in a vertical position;

FIGS. 9 and 10 illustrate two additional ways in which the invention may be used; and FIG. 11 illustrates the variant with the side hook.

Figure 1:
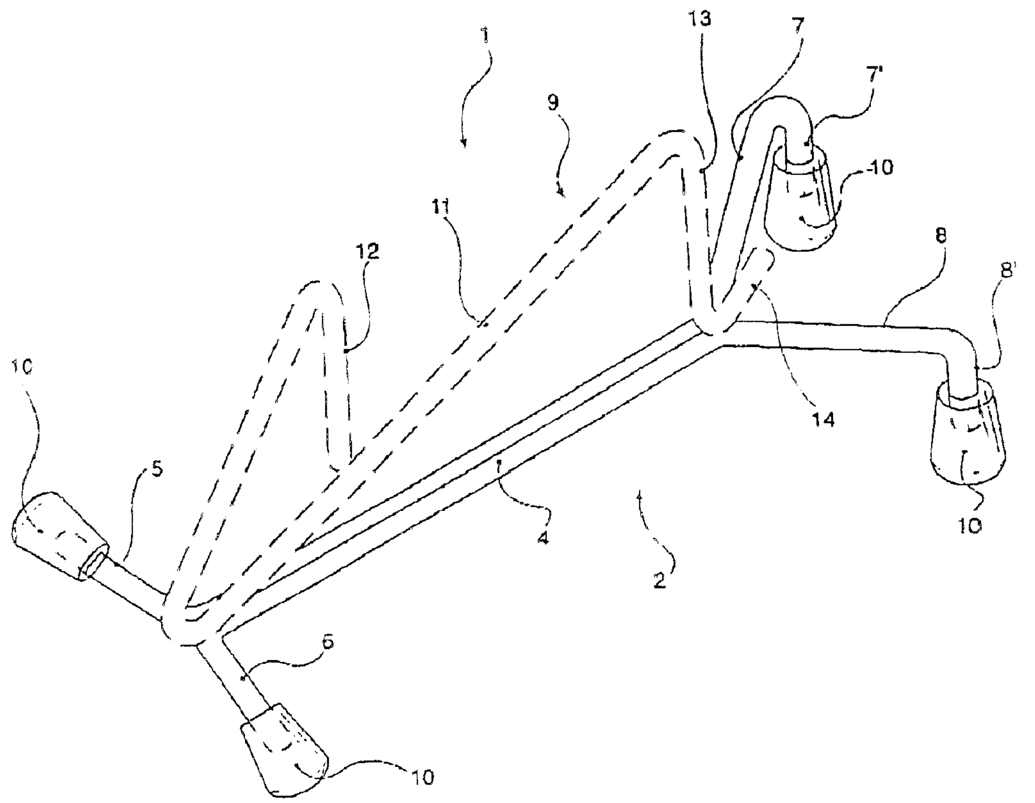
FIG. 1 is a perspective view of a chocking support as proposed by the invention.

Turning to FIG. 1, reference (1) denotes the chocking support device proposed by the invention as a whole. It consists of a bottom base structure (2), on which the top support structure is mounted.

This bottom base structure has a central section (4) in the form of a bar or tube, each end of which has two arms (5, 6 and 7, 8) running out towards the exterior. The first of these extend in a substantially perpendicular arrangement on either side of the central part (4) and have an end-piece (10) made from a non-slip material at their end. The second (7, 8), at the opposite end of this central part, fork in a V arrangement, the end (7', 8') of each branch curving downwards and also being provided with a non-slip end-piece (10).

The top structure (9) is made from a single bent bar and has a substantially horizontally inclined support portion (11) and an adjacent vertically extending chocking portion (12) . The former is intended to support the bottom face of a panel (not illustrated), for example, whilst the edge thereof is supported against the vertical chocking portion (12).

At the other end, in the extension of portion (11), the bar has a substantially vertically inclined support portion (13), the bottom free end (14) of which curves upwards. The purpose of this part of the bar will be explained below. Said bar is fixed to the base structure (2), for example by welding.

Figure 2:
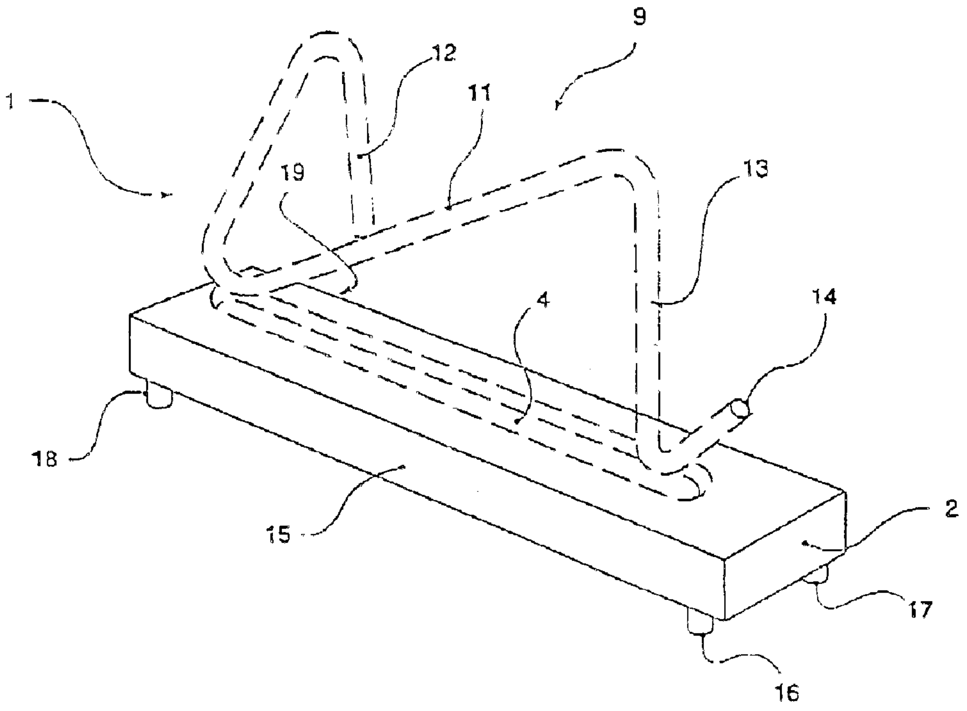
FIG. 2 is a perspective view of another embodiment of the invention.

FIG. 2 illustrates another embodiment of the invention, in which the base structure (2) is in the form of a base piece (15) of a parallelepipedic design. It is made from a lightweight material and has two non-slip feet (16, 17 and 18, 19) on its bottom face at each end.

Figure 3:
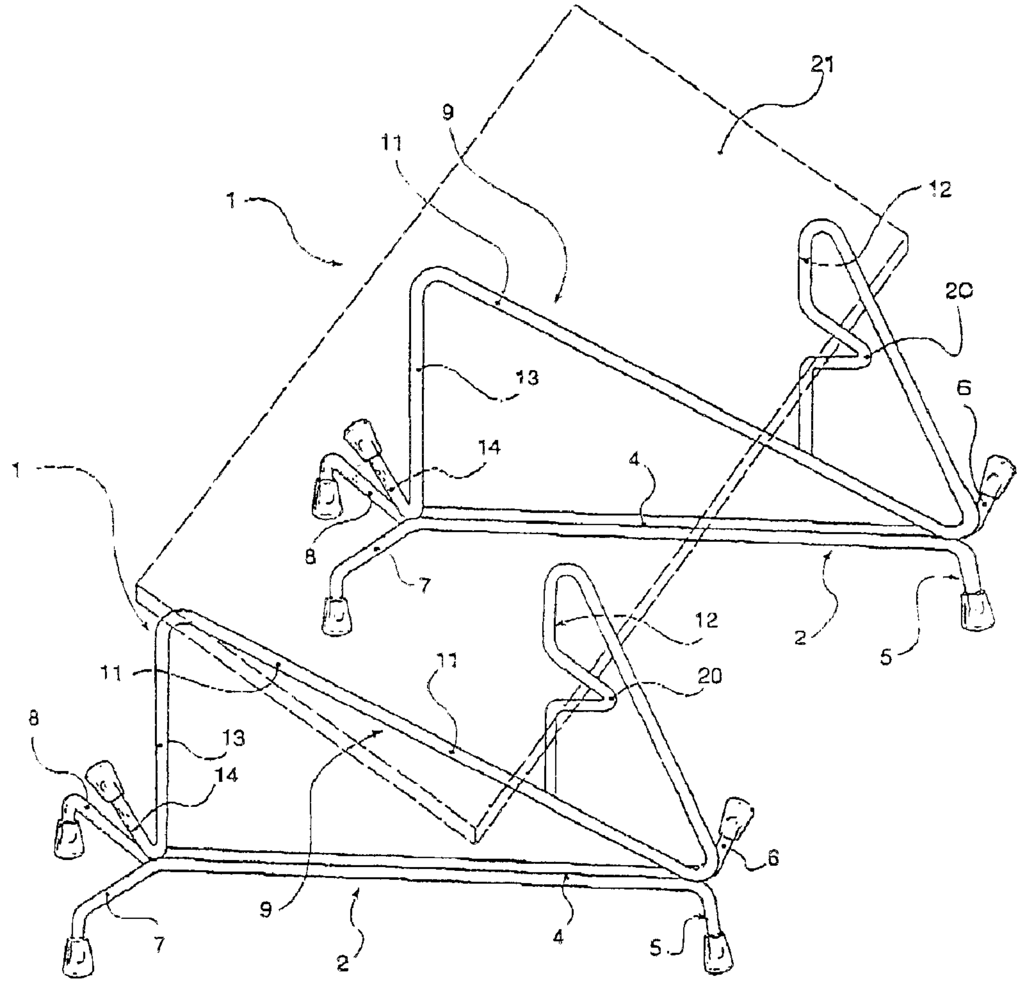
FIG. 3 illustrates a panel being chocked and supported in an inclined position by yet another embodiment of the invention.

FIG. 3 illustrates one possible way in which the device proposed by the invention may be used. The vertically extending chocking portion (12) mentioned above has a section (20) bent into a sideways V shape. Two supporting chocks (1) are disposed parallel with one another and the lateral edge of the panel (21) to be finished is accommodated in this V-shaped section (20), whilst the bottom face of this panel (21) is supported against the inclined part (11) of each supporting chock (1).

Figure 4:
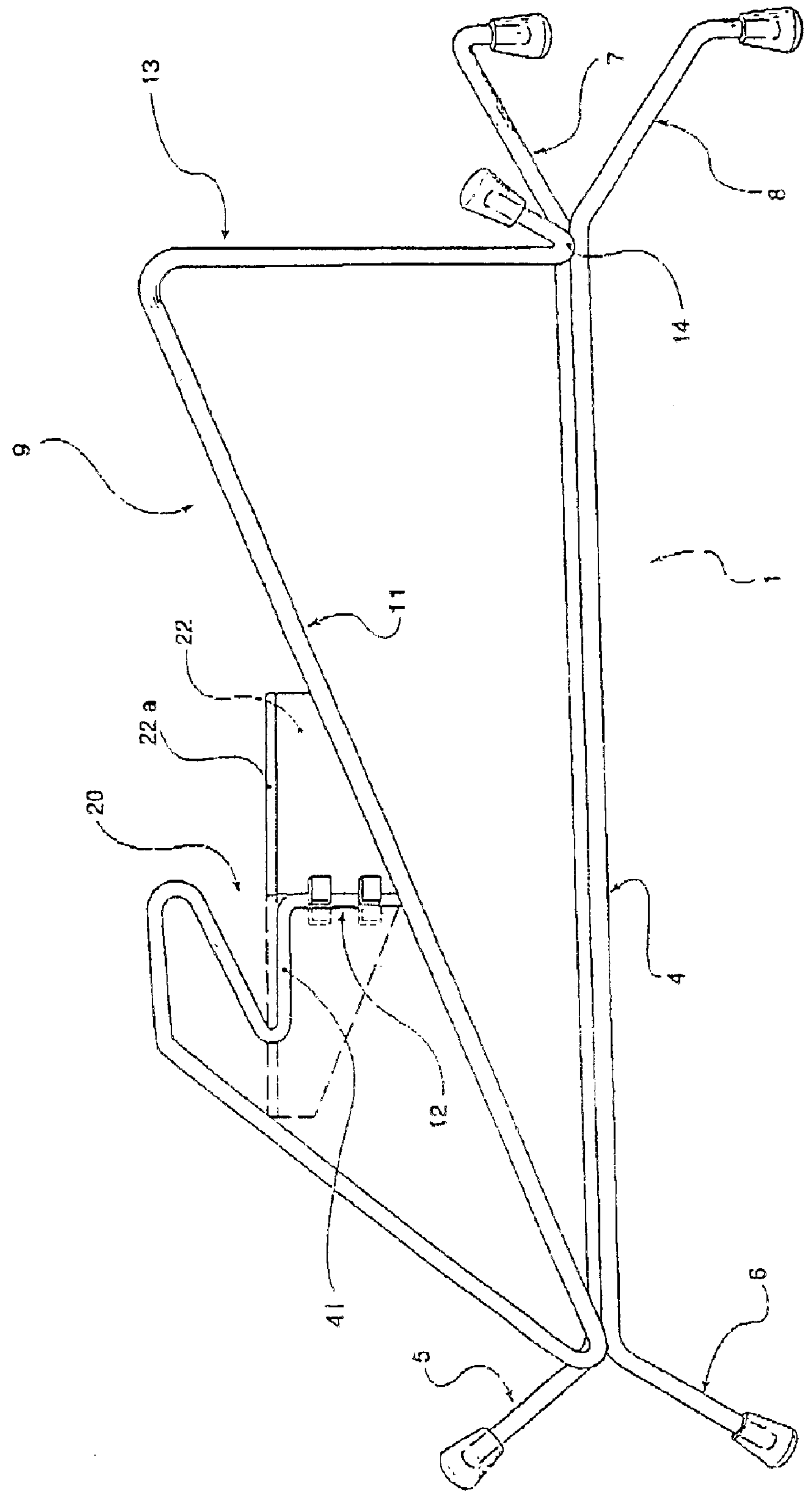
FIG. 4 illustrates the use of the embodiment illustrated in FIG. 3 as a means of clamping a board in a horizontal position.

FIG. 4 shows a variant of the support used in the arrangement illustrated in FIG. 3, with a bar (12) having a bent section (20) with a horizontally extending branch (41). A triangular piece (22) is also attached to the bottom portion of the bar (12), around which said piece (22) is able to pivot so that it can be positioned in the extension of the branch (41). The upper surface (22*a*) in conjunction with the bottom branch of the V (20) forms a support surface enabling a board to be horizontally chocked with its lateral edge clamped in the bent section (20).

Figure 5:
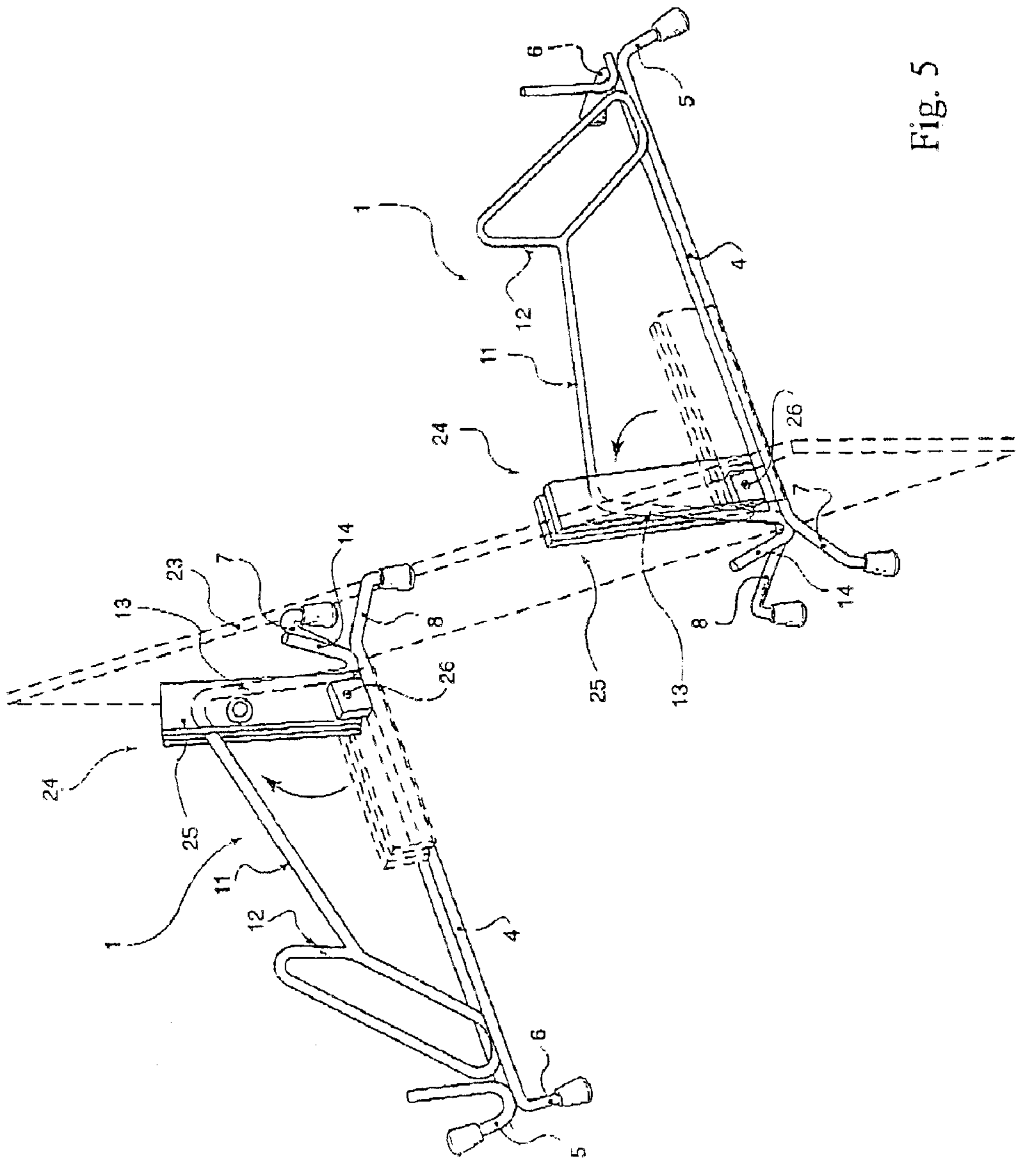
FIG. 5 is a perspective illustration showing a panel being positioned in a vertical position.

FIG. 5 illustrates the vertical positioning of a panel using two devices proposed by the invention. In this case, the supporting chocks (1) proposed by the invention are disposed on either side of said panel (23), in the vicinity of each end thereof. The bottom lateral edge of the panel (23) is then positioned in contact with the bar (13), resting in the end bent into a hook (14). This positioning is not truly stable unless a supplementary fixture is used. Consequently, each support (1) also has position-clamping means (24) which are applied symmetrically against each face of said panel (23).

In the embodiment illustrated in FIG. 5, these means (24) are provided in the form of a double piece in the shape of a rectangular chock (25), mounted on each support (1) so as to pivot about an axis (26). This piece (25) pivots from a substantially horizontal position into a vertically extending position and is applied against the panel (23) to lock it in position. The piece (25) of the other supporting chock (1) acts in the same way to complete the clamping system.

FIG. 6 illustrates another embodiment of these means (24), comprising an elastic half-washer (42) which is placed around the bar (13) in a snap-fit arrangement, in which case the panel (23) is then clamped by rotating this washer (42) about the axis formed by this bar (13) until its curvilinear periphery is supported on the face of the panel (23), thus fulfilling the same function as the piece (25) illustrated in FIG. 5.

FIG. 7 illustrates yet another variant of the clamping means, consisting of a prismatic piece (27) designed to slide along the bar (11), the end of which is moved to bear against the wall of the panel (23).

FIG. 8 illustrates an additional embodiment of a clamping arrangement, obtained by means of a bent upper portion (28)

of the outwardly projecting (13) part, in which case the clamping action is obtained by moving one of the two supporting chocks (1) whilst the other remains in a fixed position. Said movement is symbolized by broken lines indicating the device before it is moved, whilst the solid lines symbolize its active position.

The version illustrated in FIG. 9 integrates support frames (29) of a tripod design, the three bottom supporting ends of which are provided with an end-piece (30), and the vertical, upwardly extending top end (31) is fitted with the same end-piece (30). The two supporting chocks (1) are then positioned in parallel and the end (14) of the bar (13) also has a same non-slip end-piece (30) on the same level as those of the support frames (29). The panel (23) is then disposed horizontally, supported on the top ends of portions (14, 31).

Depending on how it is configured, the device proposed by the invention therefore enables a material of a specifically planar extension to be chocked and clamped in a horizontal, vertical or slightly inclined position. As a result of this modularity, an operator can carry out any worth he wishes to do in total safety by positioning his material in the most appropriate manner. For example, it might be easier to cut a board from a vertical position.

FIG. 10 illustrates how a support proposed by the invention may be used fin co-operation with a piece (32), a side edge and the bottom edge of which are provided with a center groove (33), enabling it to be positioned on the top structure (9) or a chocking support (1) as proposed by the invention, on a level with the bars (11, 12). This piece enables the plane of inclination of the support zone to be varied and thus increased the modularity of the invention.

Finally, FIG. 11 illustrates a configuration of the embodiment illustrated in FIG. 1 provided with a side hook (34) enabling an elongate tubular piece to be supported, one end of which may be wedged underneath the arm (6) in order to immobilize it and support at on the working surface. The upper part of this tubular piece may then be worked on, heated, etc.

The configurations described above are naturally only illustrative examples of the invention and are not intended to restrict it in any way. On the contrary, the invention includes all variants in terms of shape, configuration and material known to the person skilled in the art.

What is claimed is:

1. Device for enabling an article of rigid or semi-rigid material of a planar shape or of the thin, elongate type to be rapidly supported and chocked in order to carry out a finishing process thereon, characterized in that it comprises:

a top chocking structure on which the article to be finished can be supported and clamped, said top structure including at least two spaced apart chocking elements of the bar or tube type extending substantially in a vertical plane, each said element having at least one support portion for supporting one end portion of the article in a horizontal or substantially horizontal orientation, each said element being extended by a substantially vertical support portion having a generally horizontally oriented V-shaped section for reception of a second end portion of the article; and a bottom base structure on which the top structure is mounted, enabling the top chucking structure to be stabilized on a working surface, the support zones of said bottom base structure being fitted with non-slip fixtures.

2. Device according to claim 1, characterized in that the bottom base structure is made from at least one longitudinal element of the bar or tube type, with a central, horizontally extending section, each end of said horizontally extending section having two symmetrical side arms, the free ends of the side arms constituting the points of support on a working surface.

3. Device according to claim 2, characterized in that the side arms located at one of the ends extend outwardly from the central section towards the side in a symmetrical arrangement and are downwardly inclined.

4. Device according to claim 3, characterized in that the arms at the other end form a symmetrical V-shaped fork, extending in the extension of the central section of the bottom structure, the free end of each arm being downwardly bent or angled and extending vertically.

5. Device according to claim 2, characterized in that the bottom base structure of each chocking element is made from at least two symmetrical tubes, secured to one another longitudinally.

6. Device according to claim 1, characterized in that the top chocking structure has chocking means constructed and adapted to co-operate respectively with the support portions.

7. Device according to claim 6, characterized in that the support portion for supporting the article of material in a horizontal orientation is inclined and its lower end is located adjacent to a vertically extending chocking portion, the inclined portion being adapted to provide support for one side of the article of material and the lower end being adapted to support and chock an edge portion thereof.

8. Device according to claim 7, characterized in that the vertically extending chocking portion has a section bent in a sideways V-shaped arrangement having a first section and a second inclined section, the chocking portion adapted to accommodate the edge portion of a board type material, the face of which is supported against the inclined portion.

9. Device for enabling an article of rigid or semi-rigid material of a planar shape or of the thin, elongate type to be rapidly supported and chocked in order to carry out a finishing process thereon, characterized in that it comprises:

a top chocking structure on which the article to be finished can be supported and clamped, said top structure including at least two spaced apart chocking elements of the bar or tube type extending substantially in a vertical plane, each said element having at least one support portion for supporting one end portion of the article in a horizontal or substantially horizontal orientation, each said element being extended by a substantially vertical support portion having a generally horizontally oriented V-shaped section for reception of a second end portion of the member, at least one member of said V-shaped section being generally horizontal, and the second member of said V-shaped section being angled with respect to said generally horizontal member, said V-shaped section being adapted and positioned for reception of one edge portion of the article; and a bottom base structure on which the top structure is mounted, enabling the top chocking structure to be stabilized on a working surface, the support zones of said bottom base structure being fitted with non-slip fixtures.

* * * * *